(12) United States Patent
Fontanet

(10) Patent No.: US 11,441,925 B2
(45) Date of Patent: Sep. 13, 2022

(54) METHOD FOR DEFINING A MEASUREMENT RANGE OF AN INDUCTIVE POSITION SENSOR

(71) Applicants: Continental Automotive France, Toulouse (FR); Continental Automotive GmbH, Hannover (DE)

(72) Inventor: Alain Fontanet, Muret (FR)

(73) Assignees: Continental Automotive France; Continental Automotive GmbH

( * ) Notice: Subject to any disclaimer, the term of this patent is extended or adjusted under 35 U.S.C. 154(b) by 274 days.

(21) Appl. No.: 16/643,624

(22) PCT Filed: Sep. 6, 2018

(86) PCT No.: PCT/FR2018/052171
§ 371 (c)(1),
(2) Date: Mar. 2, 2020

(87) PCT Pub. No.: WO2019/048780
PCT Pub. Date: Mar. 14, 2019

(65) Prior Publication Data
US 2020/0400465 A1    Dec. 24, 2020

(30) Foreign Application Priority Data
Sep. 7, 2017   (FR) ........................................ 1758264

(51) Int. Cl.
*G01D 5/20* (2006.01)
*G01B 7/30* (2006.01)

(52) U.S. Cl.
CPC ............... *G01D 5/204* (2013.01); *G01B 7/30* (2013.01)

(58) Field of Classification Search
CPC ........ G01D 5/204; G01D 5/2073; G01D 5/22; G01D 5/225; G01D 5/2448; G01B 7/30
See application file for complete search history.

(56) References Cited

U.S. PATENT DOCUMENTS 6,249,234 B1 * 6/2001 Ely ........................ G01D 5/208
341/20
6,483,295 B2    11/2002 Irie et al.
(Continued)

FOREIGN PATENT DOCUMENTS

CN   105628059 A    6/2016
CN   106197238 A   12/2016
(Continued)

OTHER PUBLICATIONS

Chinese Office Action with Search Report for Chinese Application No. 201880057912.9, dated Apr. 26, 2021, 6 pages.
(Continued)

*Primary Examiner* — Steven L Yeninas
(74) *Attorney, Agent, or Firm* — RatnerPrestia

(57) ABSTRACT

A method for defining a measurement range, called the useful span, of the inductive position sensor with emission of a cosine and sine signal by at least one first receiver winding and at least one second receiver winding, respectively. The cosine signal emitted by the one or more second receiver windings is taken as reference signal between the two sine and cosine signals for an adjustment of at least one parameter of the sine signal depending on a corresponding parameter of the cosine signal, at least one of the dimension and positioning parameters of the one or more first receiver windings being configured to generate a sine signal having the at least one parameter of the sine signal adjusted with respect to the cosine signal.

11 Claims, 4 Drawing Sheets

(56) References Cited

U.S. PATENT DOCUMENTS

| | | |
|---|---|---|
| 9,853,526 B2 | 12/2017 | Hourne et al. |
| 10,317,249 B2 | 6/2019 | Gerardiere et al. |
| 2010/0001718 A1* | 1/2010 | Howard .................. G01B 7/30 |
| | | 324/207.15 |
| 2015/0247746 A1* | 9/2015 | Schindler ............. G01D 5/2448 |
| | | 250/231.13 |
| 2916/0146637 | 5/2016 | Gerardiere et al. |
| 2019/0195963 A1* | 6/2019 | Qama .................... H05K 1/165 |
| 2021/0302206 A1* | 9/2021 | Ferreira Da Cunha ...................... |
| | | G01D 5/2053 |

FOREIGN PATENT DOCUMENTS

| | | |
|---|---|---|
| FR | 3023369 A1 | 1/2016 |
| FR | 3023611 A1 | 1/2016 |
| FR | 3027103 A1 | 4/2016 |
| FR | 3043197 A1 | 5/2017 |

OTHER PUBLICATIONS

International Search Report and Written Opinion for International Application No. PCT/FR2018/052171, dated Feb. 5, 2019, 9 pages.

* cited by examiner

METHOD FOR DEFINING A MEASUREMENT RANGE OF AN INDUCTIVE POSITION SENSOR

CROSS REFERENCE TO RELATED APPLICATIONS

This application is the U.S. National Phase Application of PCT International Application No. PCT/FR2018/052171, filed Sep. 6, 2018, which claims priority to French Patent Application No. 1758264, filed Sep. 7, 2017, the contents of such applications being incorporated by reference herein.

FIELD OF THE INVENTION

The present invention relates to a method for defining a measurement range of a contactless inductive position sensor in order to obtain for the sensor a measurement window that is as large and as regular as possible. The inductive position sensor is suitable for detecting a movement of at least one target as it comprises at least one first receiver winding that generates a sine signal during the detection of said at least one target and at least one second receiver winding that generates a cosine signal during the detection of said at least one target.

BACKGROUND OF THE INVENTION

As is known per se, each receiver winding comprises at least two winding loops. The parameters of the sine and cosine signals, in particular the amplitude and the period of the sinusoidal signals, respectively depend on dimension and positioning parameters of said at least two winding loops. Thus, it is possible to substantially adjust for example the amplitude and/or the period and even the baseline by modifying the width and/or length of the loops of the first and second windings, respectively.

Generally, an inductive position sensor defines a spatial measurement window, for example an annular or linear segment, that is passed through periodically by one or more than one moving targets, which most frequently are in rotation.

As shown in FIG. 1, an inductive position sensor comprises, in a known manner, a printed-circuit carrier 22, which most frequently takes the form of a board. In practice, when the inductive position sensor defines an annular spatial measurement window, the printed-circuit carrier 22 is configured accordingly.

In FIG. 1, the printed-circuit carrier 22 is shown in a linear fashion, i.e. flat. This printed-circuit carrier 22 comprises a primary winding 24 and two secondary windings 25Sa, 26Ca that are coupled to the primary winding 24. The windings 24, 25Sa, 26Ca may be connected to an electronic module for managing said windings 24, 25Sa, 26Ca, this electronic module not being illustrated in FIG. 1. In a known manner, such a primary winding allows a magnetic field to be generated during the flow of current through said primary winding. The magnetic field thus created is perceived by the secondary windings, and induces a voltage in said secondary windings.

One or more targets made from a conductive material in order to allow the flow of currents, which targets are borne by the element the movement of which is to be tracked, move relative to the windings 24, 25Sa, 26Ca.

When a target is located facing the measurement window F, as illustrated in FIG. 1, the target modifies the magnetic coupling between the primary winding 24 and the two secondary windings 25Sa, 26Ca. In a known manner, the primary winding 24 is referred to as the emitter winding whereas the secondary windings 25Sa, 26Ca are referred to as receiver windings. Thus, by measuring the voltages across the terminals of the receiver windings 25Sa, 26Ca, it is possible to deduce the precise position of the target in said measurement window F. Therefore, it is possible to deduce therefrom the position of the element the movement of which is being tracked and that bears the one or more targets.

In a more detailed way, in the presence of a target in the measurement window F, the receiver windings 25Sa, 26Ca placed in proximity to said target see an amount of flux of the magnetic field that is lower than if the target were absent. If, for example, a receiver winding 25Sa, 26Ca consists of two loops of opposite orientation and if the target moves above one then the other of these loops, this receiver winding 25Sa, 26Ca sees, with respect to a zero average value, a relative increase then a relative decrease in the amount of flux of the magnetic field that passes through it.

In practice, the receiver windings 25Sa, 26Ca are of different natures. With reference to FIG. 1, which shows a close-up view of the measurement window F, it is possible to see, on the one hand, a so-called "sine" receiver winding 25Sa suitable for delivering a sine signal during a passage of a target in the measurement window F and a so-called "cosine" receiver winding 26Ca suitable for delivering a cosine signal during the passage of a target in the measurement window F. The sine/cosine signals are temporally correlated, by a computation of the arctangent, in order to precisely determine the position of the target.

By target forming sine and cosine signals, what is meant is not only a single target that interacts with receiver windings but also two target portions or at least two consecutive targets that are offset during the movement and that simultaneously interact with receiver windings.

More precisely, in FIG. 1, in order to obtain the desired sine and cosine signals, the sine receiver winding 25Sa comprises a whole loop MS− that is negatively oriented and a whole loop MS+ that is positively oriented whereas the cosine receiver winding 26Ca comprises a first positive half-loop ½ MC+, a negative whole loop MC− and a second positive half-loop ½ MC+.

When a target is not present in the measurement window F, the voltages across the terminals of the receiver windings 25Sa, 26Ca must be zero (V=0). Thus, it is necessary for the loops MS+, MS− of the sine winding 25Sa to be symmetric in order for the generated positive field to compensate for the generated negative field. As the loops MS−, MS+ of a sine winding 25Sa are whole, such a symmetry is easy to achieve.

In contrast, the symmetry of the cosine winding 26Ca is complex to obtain given that the two positive half-loops ½ MC+ must compensate for the negative whole loop MC−. In practice, because of the tolerances of definition and of manufacture of the loops, the compensation of the fields is not optimal and it is necessary to make use of compensating means that are complex and expensive to implement, this being a major drawback.

It is therefore common practice to process the cosine signal, which has more need to be corrected than the sine signal. It has therefore been proposed to establish between the windings an offset that allows sine and cosine signals to be formed from a receiver winding of a shape that is initially defined solely for a sine signal, i.e. a winding not comprising any half-loops and that generates a signal that starts with a zero value. In the prior art, when it is desired to dimension a sensor, it is attempted to give the sine and cosine the same period and it is common practice to take the period of the sine signal as reference.

Such an offset allows a cosine winding to be formed by taking advantage, to form a cosine signal, of the mathematical relationship that relates a sine to a cosine. This allows sine and cosine signals similar to the prior art but devoid of defects at the limits of the measurement window to be obtained. This is in particular illustrated by the document FR-A-3 023 611, incorporated herein by reference.

Although these solutions have been partially satisfactory, they do not allow a useful span corresponding to a measurement window in which the target is detected with a high precision to be substantially increased, this measurement window being notoriously smaller than the length of the sensor.

SUMMARY OF THE INVENTION

The problem behind an aspect of the present invention is, for an inductive position sensor having a measurement window for the detection of one or more moving targets, to increase the length of the measurement window and the precision of the detection of the target.

To this end, an aspect of the present invention relates to a method for defining a measurement range, called the useful span, of an inductive position sensor during the design thereof, the sensor being suitable for detecting a movement of at least one target as it comprises at least one first receiver winding that generates a sine signal during the detection of said at least one target and at least one second receiver winding that generates a cosine signal during the detection of said at least one target, each receiver winding comprising at least two winding loops, parameters of the sine and cosine signals respectively depending on dimension and positioning parameters of said at least two winding loops, noteworthy in that the cosine signal is taken as reference signal between the two sine and cosine signals for an adjustment of at least one parameter of the sine signal depending on a corresponding parameter of the cosine signal, at least one of said dimension and positioning parameters of said at least two loops of said at least one first receiver winding being configured to generate a sine signal having said at least one parameter of the sine signal adjusted with respect to the cosine signal.

The definition of the measurement range consists in shaping it, depending on parameters of the cosine and sine receiver windings, to make the measurement range optimal, i.e. as large as possible and such that it possesses a high linearity with little dependence of the taken measurements on the points in the measurement range at which they are taken.

In the closest prior art, which is illustrated by FR-A-3 023 611, an offset between the receiver windings allows sine and cosine signals to be formed on the basis of a receiver winding of a shape that is initially defined solely for a sine signal. An offset of a quarter of a period, i.e. of a half-loop, allows a cosine winding to be formed by taking advantage, to form a cosine signal, of the mathematical relationship that relates a sine to a cosine.

This document teaches that the cosine and sine signals are readjusted on the basis of a sine reference signal. In general, such a sine signal received for an inductive sensor is less deformed than a cosine signal and therefore serves as model for correction during a design stage.

An aspect of the present invention follows the opposite approach. It is the cosine signal that serves as model for an adjustment of the sine signal. It is however possible for it to be a corrected cosine signal that is used as model for the generation of a sine signal.

On the basis of the corrections to be made to the sine signal, it is possible to accordingly modify the parameters of the loops of the one or more first receiver windings that deliver a sine signal. Thus, an enlarged measurement window with a small variation in equivalent measurements when taken at various points in the measurement window is obtained.

Advantageously, said at least one parameter of the sine signal adjusted to the cosine signal is chosen unitarily or in combination from the following parameters: an amplitude of the sine signal, a period or wavelength of the sine signal and a deviation from a baseline of the sine signal.

Advantageously, the period or wavelength of the sine signal is determined to be equal to x times the period or wavelength of the cosine signal, x being comprised between 0.79 and 0.93, the amplitude of the sine signal being equal to the amplitude of the cosine signal and the deviation from the baseline of the sine signal being determined to be coincident with the baseline of the cosine signal.

In the closest prior art, it was sought to achieve similar parameters for the sine and cosine functions, this no longer being the case in an aspect of the present invention, at least one of the parameters no longer being similar but having a respective mathematical relationship with the parameter of the cosine function taken as reference and the equivalent parameter of the cosine function.

In addition, in the prior art, it was sought to achieve similar parameters starting with the sine function whereas, according to an aspect of the present invention, the cosine function is the reference function. Achieving equal amplitudes and coincident baselines while taking as reference the cosine function, as provided for in an aspect of the present invention, is not equivalent to achieving equal amplitudes and coincident baselines while taking as reference the sine function, as proposed in the prior art. In addition, the respective periods of the two cosine and sine functions or signals may be different.

Specifically, according to an aspect of the present invention, it is no longer sought to achieve equivalent periods for the sine and cosine signals but to achieve a specific ratio between these periods. It turns out that the imposition of a specific ratio between equivalent parameters of the sine and cosine signals allows a longer measurement window with higher precision and less dispersion in the results to be achieved.

Advantageously, the period or wavelength of the sine signal is determined to be equal to 0.86 times the period or wavelength of the cosine signal.

Advantageously, during the design of the sensor, the amplitude of the sine signal is modified by adjusting a width of said at least two loops of said at least one first receiver winding, the period of the sine signal is modified by adjusting the length of said at least two loops of said at least one first receiver winding, a smaller width or length corresponding respectively to a decrease in the amplitude or in the period of the sine signal, and the deviation from the baseline of the sine signal of said at least one first receiver winding is obtained via a transverse translation of said at least two loops of said at least one first receiver winding that generates the sine signal with respect to said at least two loops of said at least one second receiver winding.

Advantageously, said at least one first receiver winding that generates a sine signal thus modified and said at least one second receiver winding that generates a cosine signal are formed on a printed-circuit carrier.

An aspect of the invention also relates to an inductive position sensor suitable for detecting a movement of at least one target, said sensor comprising a printed-circuit carrier that bears at least one first receiver winding suitable for generating a sine signal during the detection of said at least one target and at least one second receiver winding suitable for generating a cosine signal during the detection of said at least one target, each receiver winding comprising at least two winding loops formed on the printed-circuit carrier, dimension and positioning parameters of said at least two winding loops on the printed-circuit carrier defining respective parameters of the sine and cosine signals, the sensor comprising at least one emitter winding suitable for inducing a voltage in said receiver windings, the inductive position sensor being noteworthy in that at least one parameter of said at least two winding loops of said at least one first receiver winding is adjusted to generate the predetermined sine signal depending on the corresponding parameter of said at least two winding loops of said at least one second receiver winding adjusted to generate the cosine signal.

In one preferred embodiment of the sensor according to an aspect of the present invention, a plurality of parameters of said at least two winding loops of said at least one first receiver winding are adjusted to generate the sine signal with a period or wavelength of the sine signal equal to x times the period or wavelength of the cosine signal, x being comprised between 0.79 and 0.93, the amplitude of the sine signal being equal to the amplitude of the cosine signal and the deviation from the baseline of the sine signal being determined to be coincident with the baseline of the cosine signal.

Advantageously, the emitter winding is an angular emitter winding, said at least one first receiver winding and one second receiver winding being angular.

An aspect of the invention also relates to an assembly having a fixed portion and a movable portion, at least one target being mounted on the movable portion, noteworthy in that it comprises such an inductive position sensor, the inductive position sensor being mounted on the fixed portion and suitable for detecting a movement of said at least one target during a movement of the movable portion.

Advantageously, the assembly is mounted in a motor vehicle, the movable portion taking the form of a or comprising a movable axle bearing said at least one target.

BRIEF DESCRIPTION OF THE DRAWINGS

Other features, aims and advantages of an aspect of the present invention will become apparent upon reading the detailed description that will follow and upon examining the appended drawings, given by way of non-limiting examples and in which.

DETAILED DESCRIPTION OF THE PREFERRED EMBODIMENTS

With reference to FIGS. 1 to 9, an aspect of the present invention relates to a method for defining, during a design of an inductive position sensor 2, a measurement range, called the useful span, of the sensor 2. The inductive position sensor 2 is suitable for detecting a movement of at least one target 3 borne by an element the movement of which it is necessary to detect and measure. This movement may be linear or rotary or even a combination of a plurality of movements.

Figure 9:
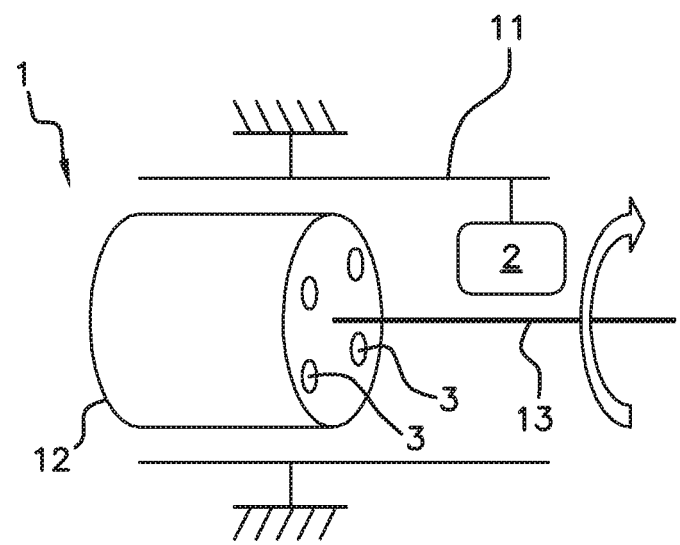
FIG. 9 shows a schematic view in perspective of an assembly comprising a fixed portion and a movable portion with at least one target mounted on the movable portion and an inductive position sensor mounted on the fixed portion, the sensor being able to be a sensor according to an aspect of the present invention.

By way of nonlimiting example of a sensor 2 and of an assembly 1 a movable portion 12 of which is intended to be tracked by an inductive position sensor 2 shown in FIG. 9, the assembly 1 may be an electric motor 1 comprising a stator portion 11 and a rotor portion 12 connected to an output shaft 13. A position sensor 2 is mounted fixedly with respect to the stator portion 11 of the motor 1 and is suitable for detecting the position of targets 3 that are fastened to the rotor portion 12 of the motor 1. In a known manner, the position of the targets 3 is detected by measurements of the output voltage of the position sensor 2.

Figure 1:
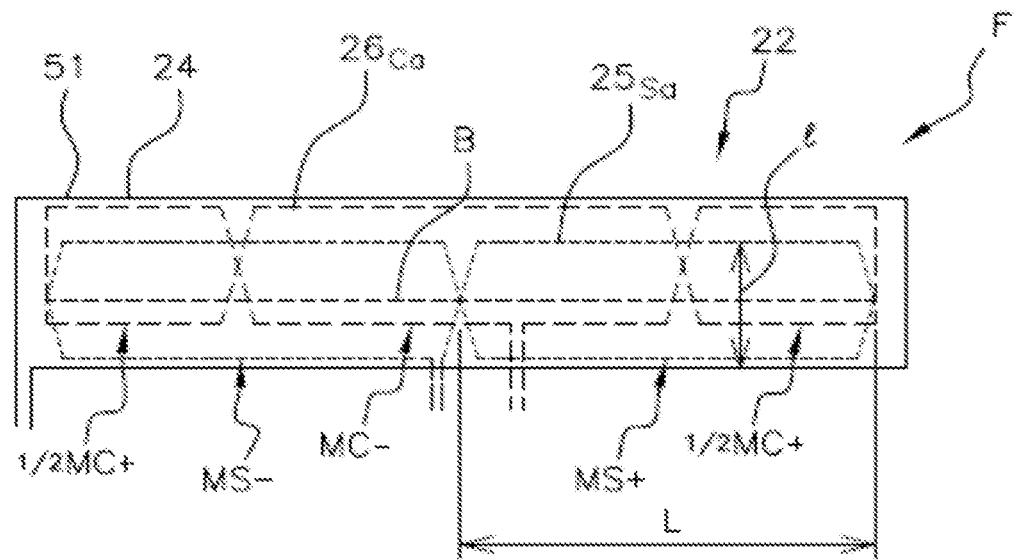
FIG. 1 is a schematic representation of an emitter winding, of a sine winding and of a cosine winding in an inductive position sensor according to the prior art.
Figure 2:
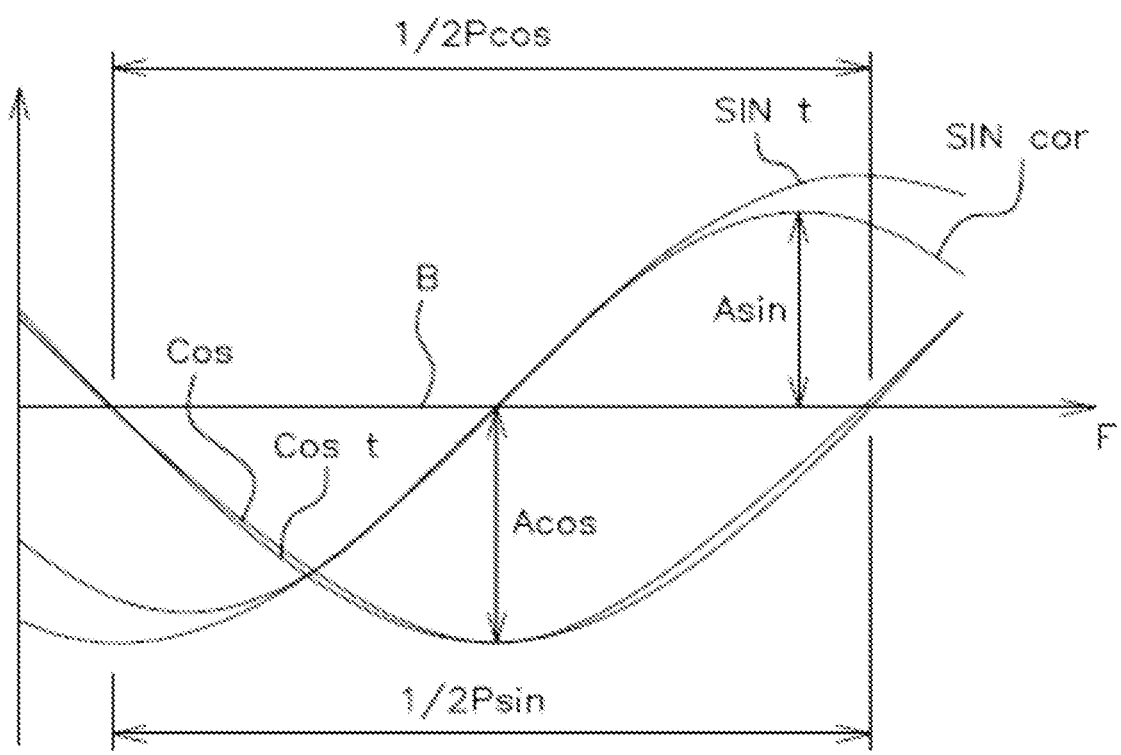
FIG. 2 is a schematic representation of sine and cosine signals delivered by an inductive position sensor during a detection of a movable target according to the prior art, with a theoretical cosine signal, an actually obtained cosine signal, a theoretical sine signal and a sine signal corrected depending on the actually obtained cosine signal, FIGS. 3 and 4 respectively show curves of linearity and of drift as a function of the gap and of the receiver windings configured to generate a sine signal and a cosine signal, respectively, these curves being obtained for a sensor according to the prior art and these windings forming part of an inductive position sensor according to the prior art, FIGS. 6 and 7 respectively show curves of linearity and of drift as a function of the gap and of the receiver windings configured to generate a sine signal and a cosine signal, respectively, these curves being obtained for a sensor according to one embodiment of the present invention and these windings forming part of an inductive position sensor according to one embodiment of the present invention.
Figure 5:
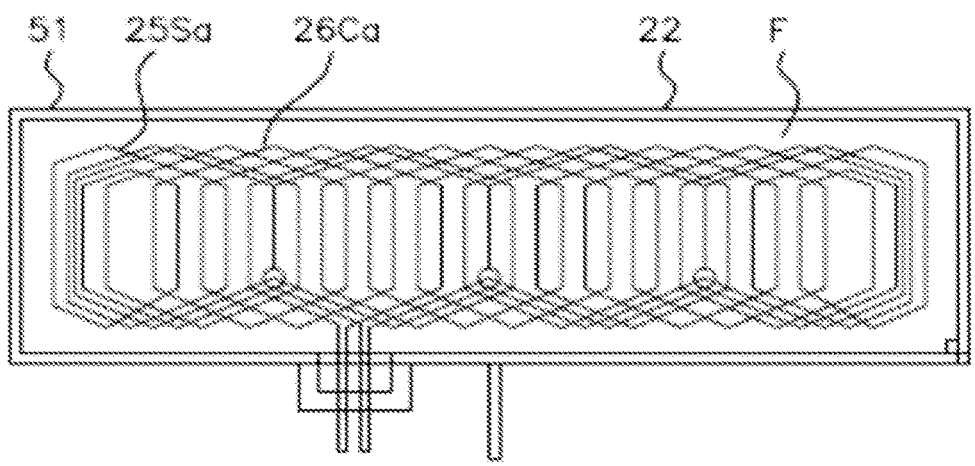
FIGS. 5 and 8 show a measurement window of an inductive position sensor according to the prior art and according to one embodiment of the present invention, respectively, the measurement window for each of these FIGS. 5 and 8 comprising an emitter winding, sine and cosine receiver windings, the sine windings having been modified in FIG. 8 with respect to FIG. 5 depending on a cosine signal delivered by the cosine windings.
Figure 8:
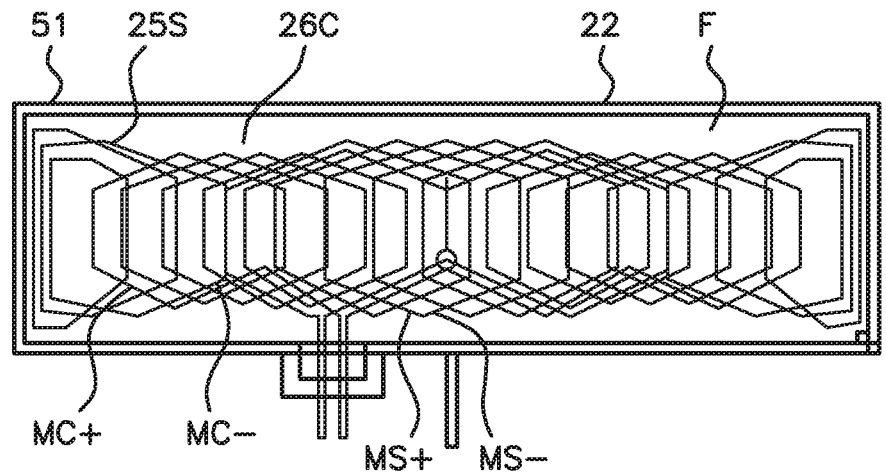

As may be particularly clearly seen in FIGS. 1, 5 and 8 and with reference also to FIG. 2, generally, the inductive position sensor comprises at least one first receiver winding 25S, 25Sa that generates a sine signal during the detection of said at least one target 3 and at least one second receiver winding 26C, 26Ca that generates a cosine signal COS during the detection of said at least one target 3. Each receiver winding 25S, 25Sa, 26C, 26Ca comprises at least two winding loops MS+, MS, MC+, MC−. As shown in FIGS. 5 and 8, there may be a plurality of sine signal or cosine signal COS winding loops that overlap with an offset therebetween.

FIG. 2 shows four signals, namely two cosine signals and two sine signals. The signal COS t indicates a theoretical signal giving a perfect cosine signal whereas the signal COS is the signal actually obtained by the sensor and that is kept as reference. FIG. 2 also shows a theoretical signal giving a perfect sine signal SIN t and a sine signal SIN cor corrected depending on the cosine signal COS actually obtained.

Respective amplitudes of the sine and cosine signals and half-periods of the sine and cosine signals have also been referenced, Asin, Acos, ½Psin and ½Pcos, respectively, a respective period Psin or Pcos hence being extrapolable. In the present patent application reference will therefore be made to a sine signal period Psin and to a cosine signal period Pcos even though half-periods ½Psin and ½Pcos are referenced in the figures. Reference is also made to a deviation from a baseline B of the sine signal.

The association of a cosine signal COS with a theoretical sine signal SIN t having the same wavelengths and amplitude as a perfect cosine signal COS t gives a fairly poor linearity.

It has been observed that the sine signal SIN cor corrected depending on the actually obtained cosine signal COS differs from the perfect theoretical sine SIN t but gives a very good linearity and a low drift in gap.

As especially shown in FIGS. 1 and 2, cosine- and sine-signal parameters Asin, Acos, Psin, Pcos, B are dependent on dimension and positioning parameters L, I, B of said at least two winding loops MS+, MS−, MC+, MC−, respectively. According to an aspect of the invention, the cosine signal COS is taken as reference signal between the two signals, i.e. the sine signal and the cosine signal COS, for an adjustment of at least one parameter Asin, Psin, B of the sine signal, which is then said to be corrected SIN cor, depending on a corresponding parameter A cos, P cos, B of the cosine signal COS.

This is obtained because at least one of said dimension and positioning parameters L, I, B of said at least two loops MS+, MS− of said at least one first receiver winding 25S is configured to generate a sine signal SIN cor having said at least one parameter Asin, Psin, B of the sine signal SIN adjusted to a corresponding parameter Acos, Pcos, B of the cosine signal COS.

With reference to all the figures, an aspect of the invention also relates to an inductive position sensor 2 suitable for detecting a movement of at least one target 3 borne by an element 1 the movement of at least one movable portion 12 of which is detected and measured. The inductive position sensor 2 comprises a printed-circuit carrier 22, for example a printed-circuit board that is planar for a linear inductive sensor 2 or that is annular for an angular inductive position sensor 2.

The printed-circuit carrier 22 bears at least one first receiver winding 25S suitable for generating a sine signal SIN during the detection of said at least one target 3 and at least one second receiver winding 26C suitable for generating a cosine signal COS during the detection of said at least one target 3. In FIG. 8, which shows one embodiment according to an aspect of the invention, as in FIG. 5, which shows a printed-circuit carrier 22 according to the prior art as regards the receiver windings 25Sa and 26Ca, there are a plurality of receiver windings 25S and 26C for a respective cosine and sine signal.

Each receiver winding 25S, 26C comprises at least two winding loops MS+, MS−, MC+, MC− formed on the printed-circuit carrier 22, dimension and positioning parameters L, I, B of said at least two winding loops MS+, MS−, MC+, MC− on the printed-circuit carrier 22 defining respective parameters A, P, B of the sine and cosine signals SIN, COS. The sensor 2 comprises at least one emitter winding 51 suitable for inducing a voltage in said receiver windings 25S, 26C.

According to an aspect of the invention, at least one parameter Asin, Psin, B of said at least two winding loops MS+, MS− of said at least one first receiver winding 25S is adjusted to generate the predetermined sine signal SIN cor depending on the corresponding parameter of said at least two winding loops MC+, MC− of said at least one second receiver winding 26C suitable for generating the cosine signal COS.

Figure 3:
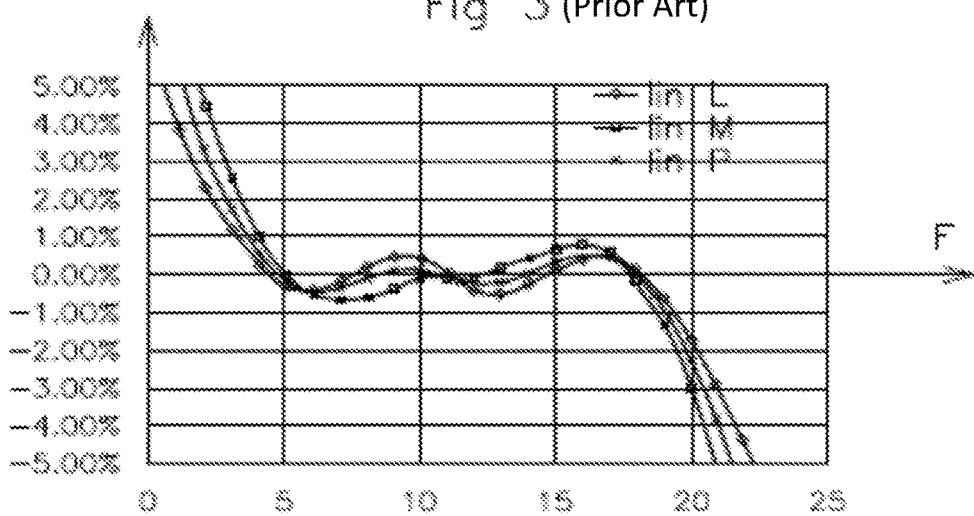
Figure 4:
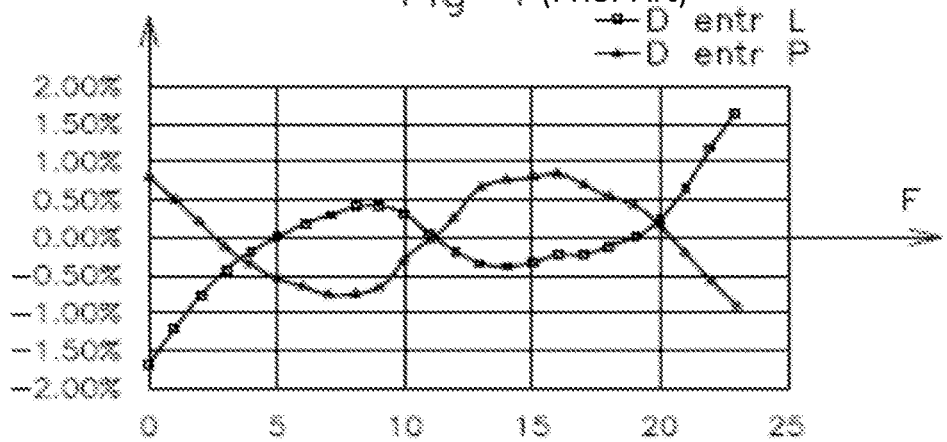
Figure 6:
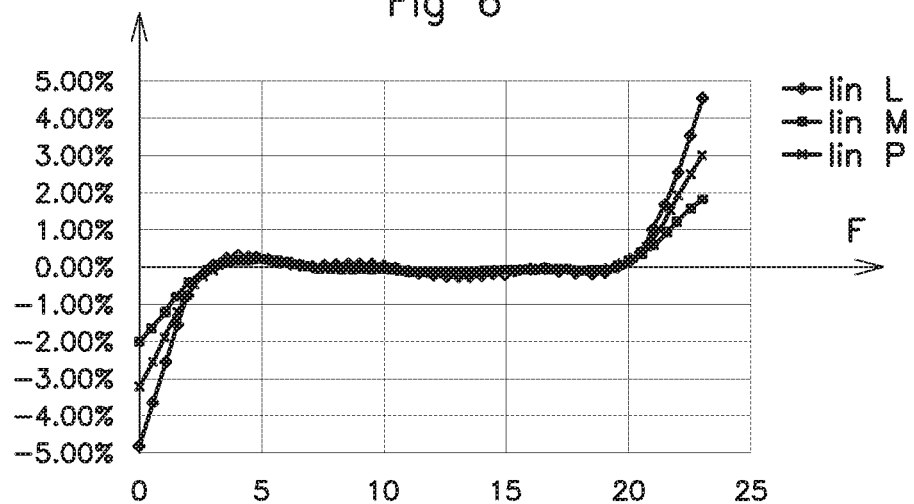
Figure 7:
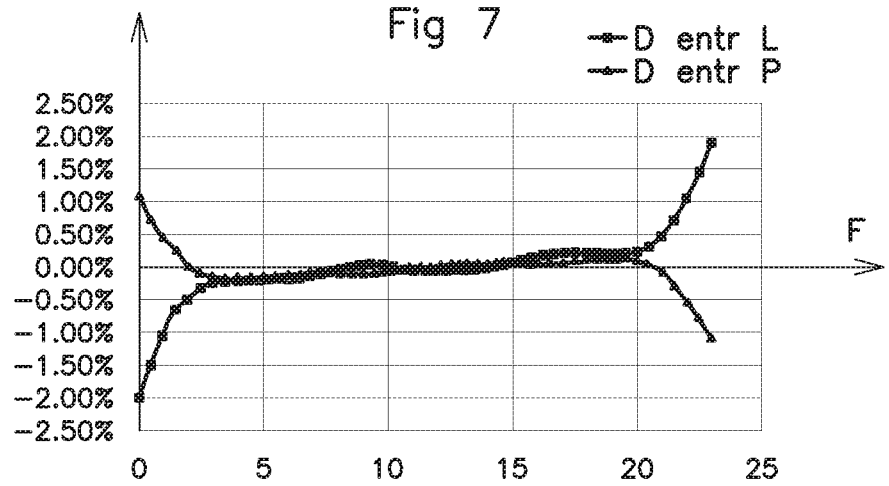

FIGS. 3 to 5 relate to a prior-art sensor 2 whereas FIGS. 6 to 8 relate to a sensor 2 according to one embodiment of the present invention.

With reference also to FIG. 1, FIGS. 3 and 6 each show three linearity curves with a top linearity curve lin L, a middle linearity curve lin M and a bottom linearity curve Lin P, as a function of the length of the useful span or range of the sensor 2 measured at one end of the measurement window F mentioned above in the introductory section of the present patent application. These linearity curves allow a length of the useful range of the sensor, which length is in general centered symmetrically with respect to the middle of the measurement window F, to be determined.

In a prior-art sensor, as shown in FIG. 3, the acceptable linearity defining the useful range is of +/−1.2% and a useful span or range, in which this value is not exceeded, of 14.75 mm is deduced therefrom. Even in the useful range of the sensor, there is a large variation in the linearity, which varies by +/−0.9%.

In a sensor according to one embodiment of the present invention, as shown in FIG. 6, the acceptable linearity defining the useful range is of +/−1% and a useful span or range, in which this value is not exceeded, of 19 mm is deduced therefrom. In the useful range of the sensor, there is a small variation in the linearity, which varies by +/−0.3%.

FIGS. 4 and 7 each show two curves of drift as a function of the gap with a corrected top drift curve Dentr L and a corrected bottom drift curve Dentr P, as a function of a length of the useful span or range of the sensor measured at one end of the measurement window F, the drift of a sensor necessarily being comprised between these two curves. These drift curves allow a length of the useful range of the sensor, which length is in general centered symmetrically with respect to the middle of the measurement window F, to be determined.

In FIG. 4, for a prior-art sensor, the drift varies by +/−0.8% in the median zone of the curves between 5 and 20 units of distance from one end of the measurement window F whereas in FIG. 7, for a sensor according to one embodiment of the present invention, the drift practically does not vary at all in the median zone, it being lower than 0.2% of the curves between 3 and 20 units of distance from one end of the measurement window F.

In light of FIGS. 3, 4, 6 and 7, it may be seen that the useful span has been increased for a sensor according to an aspect of the present invention and that the linearity and gap-dependent-drift performance levels have been increased by more than 30% with respect to those of a prior-art sensor, this being appreciable.

With reference also to FIG. 2, FIGS. 5 and 8 show a first receiver winding (referenced 25Sa and 25S, respectively), which is configured to generate a corrected sine signal in FIG. 8, and a second receiver winding (referenced 26Ca and 26C, respectively), which is configured to generate a cosine signal COS. In FIG. 8, and taking into account FIG. 2, the amplitude Asin and the period Psin of the sine signal SIN cor have been decreased, this corresponding to a decrease in the width and in the length of the loops of the first receiver winding 25S.

With reference once again to the increasing method and more particularly to FIG. 2, the one or more parameters Asin, Psin, B of the sine signal SIN cor adjusted to the cosine signal COS are chosen unitarily or in combination from the following parameters: an amplitude Asin of the sine signal SIN, a period Psin or wavelength of the sine signal SIN and a deviation from a baseline B of the sine signal.

In one preferred embodiment of the present invention, the period Psin or wavelength of the sine signal SIN is determined to be equal to x times the period P or wavelength of the cosine signal COS, x being comprised between 0.79 and 0.93. In this embodiment, the amplitude Asin of the corrected sine signal SIN cor may be equal to the amplitude Acos of the cosine signal COS and the deviation from the baseline B of the sine signal SIN may be determined to be coincident with the baseline B of the cosine signal. It is also possible for the amplitude Asin of the sine signal SIN cor and the baseline B of the sine signal SIN cor to be adjusted differently depending on the amplitude Acos and the baseline B of the cosine signal COS.

Advantageously, the period Psin or wavelength of the corrected sine signal SIN cor is determined to be equal to 0.86 times the period Pcos or wavelength of the cosine signal COS. The range indicated above therefore extends about this median value of 0.86 from 0.86-0.07 i.e. 0.79 to 0.86+0.07 i.e. 0.93.

As shown in FIGS. 2 and 8, during the design of the sensor, the amplitude Asin of the corrected sine signal SIN cor may be modified by adjusting a width I of said at least two loops MS+, MS− of said at least one first receiver winding 25S, and the period Psin of the corrected sine signal SIN cor is modified by adjusting the length L of said at least two loops MS+, MS− of said at least one first receiver winding 25S. A smaller width I or length L corresponds to a decrease in the amplitude Asin or in the period Psin of the corrected sine signal SIN cor, respectively. This may be done in the sense of the preferred embodiment of the present invention with wavelengths of the sine and cosine functions having a predetermined ratio varying from 0.79 to 0.93, and preferably of 0.86.

Lastly, the deviation from the baseline B of the corrected sine signal SIN cor of said at least one first receiver winding 25S may be obtained via a transverse translation of said at least two loops MS+, MS− of said at least one first receiver winding 25S that generate the corrected sine signal SIN cor with respect to said at least two loops MC+, MC− of said at least one second receiver winding 26C.

According to the preferred embodiment of the present invention, a plurality of parameters L, I, B of said at least two winding loops MS+, MS− of said at least one first receiver winding 25S may be adjusted to generate the sine signal SIN cor with a period Psin or wavelength of the sine signal SIN cor equal to x times the period P or wavelength of the cosine signal COS, x being comprised between 0.79 and 0.93.

In this case, the amplitude Asin of the sine signal SIN may be equal to the amplitude Acos of the cosine signal COS, the deviation from the baseline B of the sine signal SIN cor being determined to be coincident with the baseline B of the cosine signal. With reference especially to FIGS. 2 and 8, the one or more thus modified first receiver windings 25S that generate a sine signal SIN cor and the one or more second receiver windings 26C that generate a cosine signal COS, and advantageously a plurality of windings of each type, may be formed on a printed-circuit carrier 22.

Depending on the selected type of inductive position sensor, a linear sensor or a rotary sensor for example, the type of the first and second receiver windings 25S, 26C may change. For example, for a rotary sensor, the emitter winding, which is referenced 51 in FIG. 1, is an angular emitter winding and the one or more first receiver windings 25S and second receiver windings 26C are angular.

With reference mainly to FIG. 9, an aspect of the invention also relates to an assembly 1 comprising a fixed portion 11 and a movable portion 12, at least one target 3 being mounted on the movable portion 12. Such an assembly 1 comprises an inductive position sensor 2 such as described above, the inductive position sensor 2 being suitable for detecting a movement of said at least one target 3 during a movement of the movable portion 12.

In a preferred but nonlimiting application, the assembly 1 forms part of a motor vehicle and comprises at least one movable and advantageously rotating axle 13 that bears said at least one target 3.

The invention claimed is:

1. A method for defining a measurement range, called the useful span, of an inductive position sensor during the design thereof, the sensor being suitable for detecting a movement of at least one target the method comprising:
   generating, by at least one first receiver winding, a sine signal during the detection of said at least one target;
   generating, by at least one second receiver winding, a cosine signal during the detection of said at least one target, each receiver winding comprising at least two winding loops, parameters of the sine and cosine signals respectively depending on dimension and positioning parameters of said at least two winding loops;
   taking the cosine signal as a reference signal between the two sine and cosine signals for an adjustment of at least one parameter of the sine signal depending on a corresponding parameter of the cosine signal; and
   configuring at least one of said dimension and positioning parameters of said at least two loops of said at least one first receiver winding to generate the sine signal having said at least one parameter of the sine signal adjusted with respect to the cosine signal,
   wherein a period or a wavelength of the sine signal is determined to be equal to x times a period or a wavelength of the cosine signal, x being comprised between 0.79 and 0.93, the amplitude of the sine signal being equal to an amplitude of the cosine signal and the deviation from the baseline of the sine signal being determined to be coincident with the baseline of the cosine signal.

2. The method as claimed in claim 1, wherein said at least one parameter of the sine signal adjusted to the cosine signal is chosen unitarily or in combination from the following parameters: an amplitude of the sine signal, a period or wavelength of the sine signal and a deviation from a baseline of the sine signal.

3. The method as claimed in claim 1, wherein the period or the wavelength of the sine signal is determined to be equal to 0.86 times the period or the wavelength of the cosine signal.

4. The method as claimed in claim 1, wherein, during the design of the sensor, at least one of:
   an amplitude of the sine signal is modified by adjusting a width of said at least two loops of said at least one first receiver winding,
   a period of the sine signal is modified by adjusting a length of said at least two loops of said at least one first receiver winding,
   a smaller width or length corresponding respectively to a decrease in the amplitude or in the period of the sine signal, and
   a deviation from the baseline of the sine signal of said at least one first receiver winding is obtained via a transverse translation of said at least two loops of said at least one first receiver winding that generates the sine signal with respect to said at least two loops of said at least one second receiver winding.

5. The method as claimed in claim 4, wherein said at least one first receiver winding that generates a sine signal thus modified and said at least one second receiver winding that generates a cosine signal are formed on a printed-circuit carrier.

6. The method as claimed in claim 1, wherein the at least one parameter of the sine signal includes a period or wavelength of the sine signal.

7. An inductive position sensor suitable for detecting a movement of at least one target, said sensor comprising:
   a printed-circuit carrier that bears at least one first receiver winding suitable for generating a sine signal during the detection of said at least one target and at least one second receiver winding suitable for generating a cosine signal during the detection of said at least one target, each receiver winding comprising at least two winding loops formed on the printed-circuit carrier, dimension and positioning parameters of said at least two winding loops on the printed-circuit carrier defining respective parameters of the sine and cosine signals;
   at least one emitter winding suitable for inducing a voltage in said receiver windings, the inductive position sensor being characterized in that at least one of the dimension and positioning parameters of said at least two winding loops of said at least one first receiver winding is adjusted to generate the predetermined sine signal depending on a parameter of the sine signal that is adjusted with respect to the cosine signal, the cosine signal being taken as a reference signal between the two sine and cosine signals for an adjustment of at least one parameter of the sine signal depending on a corresponding parameter of the cosine signal of said at least two winding loops of said at least one second receiver winding adjusted to generate the cosine signal,
   wherein a plurality of the dimension and positioning parameters of said at least two winding loops of said at least one first receiver winding are adjusted to generate the sine signal with a period or a wavelength of the sine signal equal to x times the period or a wavelength of the cosine signal, x being comprised between 0.79 and 0.93, the amplitude of the sine signal being equal to the amplitude of the cosine signal and a deviation from the baseline of the sine signal being determined to be coincident with the baseline of the cosine signal.

8. The sensor as claimed in claim 7, wherein the emitter winding is an angular emitter winding, said at least one first receiver winding and one second receiver winding being angular.

9. An assembly having a fixed portion and a movable portion, at least one target being mounted on the movable portion, comprising an inductive position sensor as claimed in claim 7, the inductive position sensor being mounted on the fixed portion and suitable for detecting a variation in the position of said at least one target during a movement of the movable portion.

10. The assembly as claimed in claim 9, wherein the assembly is mounted in a motor vehicle, the movable portion taking the form of a or comprising a movable axle bearing said at least one target.

11. The sensor as claimed in claim 7, wherein the emitter winding is an angular emitter winding, said at least one first receiver winding and one second receiver winding being angular.

* * * * *